United States Patent
Running et al.

(10) Patent No.: US 10,479,168 B2
(45) Date of Patent: Nov. 19, 2019

(54) SYSTEM AND METHOD FOR CONTROLLING COOLANT FLOW THROUGH A HEATER CORE OF A VEHICLE TO INCREASE AN ENGINE AUTO-STOP PERIOD

(71) Applicant: GM Global Technology Operations LLC, Detroit, MI (US)

(72) Inventors: Aaron P. Running, Rochester Hills, MI (US); Steven R. Baldwin, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 15/489,970

(22) Filed: Apr. 18, 2017

(65) Prior Publication Data
US 2018/0297442 A1  Oct. 18, 2018

(51) Int. Cl.
| | |
|---|---|
| *B60H 1/00* | (2006.01) |
| *F02N 11/08* | (2006.01) |
| *F01P 3/20* | (2006.01) |
| *F01P 7/14* | (2006.01) |

(52) U.S. Cl.
CPC ..... *B60H 1/00764* (2013.01); *B60H 1/00485* (2013.01); *B60H 1/00878* (2013.01); *F01P 3/20* (2013.01); *F02N 11/0803* (2013.01); *F01P 2007/146* (2013.01); *F01P 2031/30* (2013.01); *F01P 2060/08* (2013.01); *Y02T 10/48* (2013.01)

(58) Field of Classification Search
CPC ............ B60H 1/00764; B60H 1/00485; B60H 1/00878; F02N 11/0803; F02N 11/0844; F01P 7/16; F01P 2037/02; F01P 2007/146; F02D 41/042; F02D 41/005
See application file for complete search history.

(56) References Cited

U.S. PATENT DOCUMENTS

| | | | | |
|---|---|---|---|---|
| 4,653,537 A | * | 3/1987 | Voith ................. | F16K 11/0836 137/625.43 |
| 5,967,185 A | * | 10/1999 | Baruschke ......... | B60H 1/00485 137/625.29 |

(Continued)

FOREIGN PATENT DOCUMENTS

FR       2914228 A1 * 10/2008     ......... B60H 1/00778

OTHER PUBLICATIONS

Kowsky, C., Wolfe, E., Chowdhury, S., Ghosh, D. et al., "PCM Evaporator with Thermosiphon," SAE Technical Paper 2014-01-0634, 2014, 12 pgs., doi:10.4271/2014-01-0634.

*Primary Examiner* — Joseph J Dallo
*Assistant Examiner* — Kurt Philip Liethen (57) ABSTRACT

A system according to the present disclosure includes a start-stop module, a bypass valve control module, and a flapper valve control module. The start-stop module is configured to stop an engine of a vehicle independent of an ignition system of the vehicle. The bypass valve control module is configured to adjust a bypass valve to a bypass position to prevent engine coolant from flowing from the engine to a heater core of the vehicle when the engine is stopped independent of the ignition system. The flapper valve control module is configured to control a flapper valve to adjust an amount of airflow from an evaporator of the vehicle to a cabin of the vehicle through the heater core.

20 Claims, 6 Drawing Sheets

(56) References Cited

U.S. PATENT DOCUMENTS

| | | | |
|---|---|---|---|
| 2008/0184974 A1* | 8/2008 | Kobayashi | F02M 26/26 123/568.12 |
| 2014/0090414 A1* | 4/2014 | McLane | F16K 5/0471 62/510 |
| 2014/0103128 A1* | 4/2014 | Patel | B60H 1/00885 237/5 |
| 2015/0343878 A1* | 12/2015 | Pietsch | B60H 1/00035 165/42 |

* cited by examiner

SYSTEM AND METHOD FOR CONTROLLING COOLANT FLOW THROUGH A HEATER CORE OF A VEHICLE TO INCREASE AN ENGINE AUTO-STOP PERIOD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling coolant flow through a heater core of a vehicle to increase an engine auto-stop period.

A heating, ventilation, and air conditioning (HVAC) subsystem of a vehicle typically includes a compressor, a condenser, an expansion valve, an evaporator, a heater core, a blower, and a flapper valve. The compressor pressurizes refrigerant flowing from the evaporator to the condenser, and thereby circulates the refrigerant through the HVAC system. The condenser cools refrigerant as the refrigerant flows through coils in the condenser. The expansion valve reduces the pressure of refrigerant flowing from the condenser to the evaporator.

The blower forces air through the evaporator, and the heater core, into the interior of the vehicle. Refrigerant flowing through coils in the evaporator absorbs heat from air flowing across coils in the evaporator, thereby cooling the air. Engine coolant flowing through the heater core rejects heat to air flowing through the heater core, thereby heating the air.

The position of the flapper valve controls the amount of airflow through the heater core in order to achieve a desired air temperature within a cabin of the vehicle. In one example, the position of the flapper valve is adjusted to direct all of the airflow through the heater core when maximum heating is desired. In another example, the position of the flapper valve is adjusted to prevent any airflow through the heater core when maximum cooling is desired.

SUMMARY

A system according to the present disclosure includes a start-stop module, a bypass valve control module, and a flapper valve control module. The start-stop module is configured to stop an engine of a vehicle independent of an ignition system of the vehicle. The bypass valve control module is configured to adjust a bypass valve to a bypass position to prevent engine coolant from flowing from the engine to a heater core of the vehicle when the engine is stopped independent of the ignition system. The flapper valve control module is configured to control a flapper valve to adjust an amount of airflow from an evaporator of the vehicle to a cabin of the vehicle through the heater core.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A compressor in a heating, ventilation, and air conditioning (HVAC) system of a vehicle may be driven by an engine of the vehicle or by an electric motor of the vehicle. In either case, the compressor is typically turned off when the engine is turned off, and therefore the compressor does not circulate refrigerant through the HVAC system when the engine is turned off. Thus, when an engine is automatically stopped (i.e., turned off independent of an ignition system of the vehicle), the ability of the evaporator to cool air flowing therethrough diminishes as the temperature of stagnant refrigerant in the evaporator increases. Once the evaporator is unable to cool the air to a comfortable temperature, the engine is automatically restarted.

To address this issue, an HVAC subsystem according to the present disclosure includes a bypass valve disposed between the engine and a heater core of the HVAC subsystem. When the engine is on and cooling is desired, an HVAC control module according to the present disclosure adjusts the position of the bypass valve to prevent coolant flow from the engine to the heater core. In turn, air flowing from the evaporator through the heater core cools engine coolant in the heater core. Then, when the engine is automatically stopped, the HVAC control module adjusts the position of a flapper valve to direct most or all of the airflow from the evaporator through the heater core before the air enters a cabin of the vehicle. As the air flows through the heater core, the engine coolant in the heater core absorbs heat from the air. In this way, the HVAC control module increases the period for which the cabin air temperature is maintained at a desired temperature during an engine auto-stop by using the heater core as a cold storage device. As a result, the engine may be automatically stopped for longer periods, which may improve fuel economy.

Figure 1:
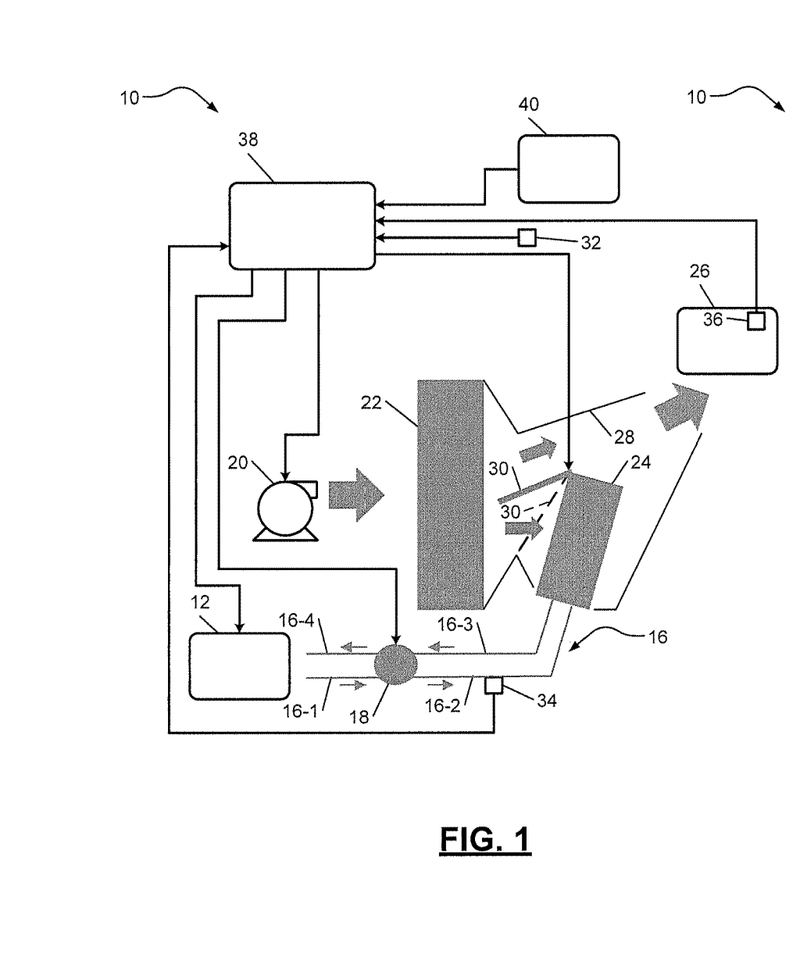
FIG. 1 is a functional block diagram of an example of a vehicle system including a bypass valve according to the principles of the present disclosure, with the bypass valve in an open position.
Figure 2:
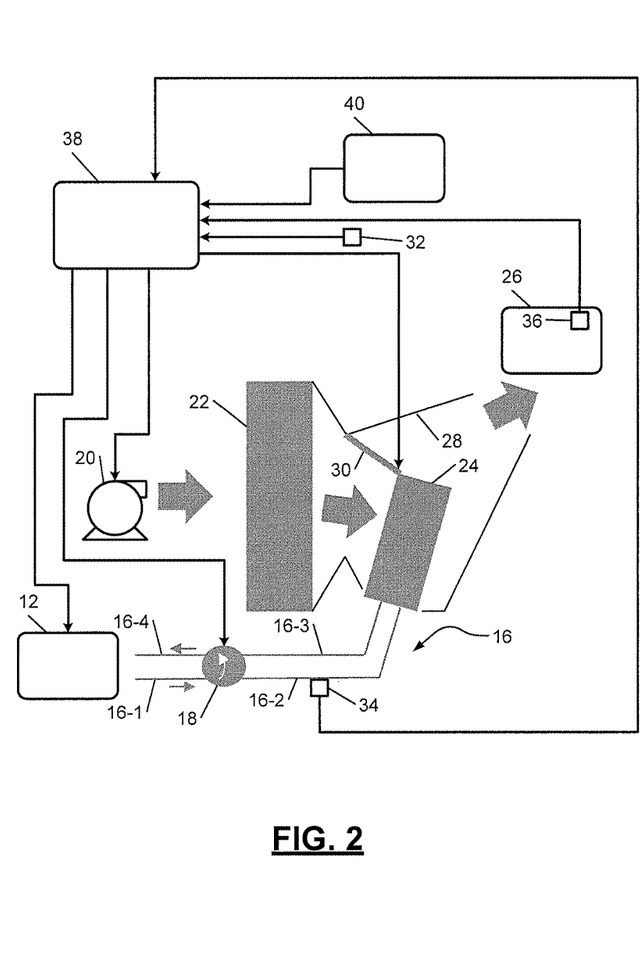
FIG. 2 is a functional block diagram of the vehicle system of FIG. 1 with the bypass valve in a bypass position.

Referring now to FIGS. 1 and 2, a vehicle system 10 includes an engine 12, coolant lines 16, a bypass valve 18, a blower 20, an evaporator 22, a heater core 24, a cabin 26, an air duct 28, and a flapper valve 30. The engine 12 combusts an air/fuel mixture to produce drive torque. Coolant is circulated through the engine 12 to cool the engine 12. The heater core 24 receives coolant from the engine 12 through the coolant lines 16.

The blower 20 blows air through the air duct 28, past the evaporator 22 and the heater core 24, to the interior of the cabin 26. The evaporator 22 cools air as the air flows through the evaporator 22. A compressor (not shown) may circulate refrigerant through a condenser (not shown), an expansion valve (not shown), and/or the evaporator 22. Refrigerant flowing through the evaporator 22 may cool air flowing through the evaporator 22 by absorbing heat from the air.

The heater core 24 heats or cools air flowing through the heater core 24 depending on the temperature of engine coolant flowing through the heater core 24 relative to the temperature of the air flowing through the heater core 24. The heater core 24 heats air flowing through the heater core 24 when the temperature of engine coolant flowing through the heater core 24 is greater than the temperature of the air flowing through the heater core 24. The heater core 24 cools air flowing through the heater core 24 when the temperature of engine coolant flowing through the heater core 24 is less than the temperature of the air flowing through the heater core 24.

The flapper valve 30 is operable to adjust the amount of air flowing from the evaporator 22 to the cabin 26 through the heater core 24. The flapper valve 30 may include a plate and an actuator, such as a servomotor, which adjusts the position of the plate. The flapper valve 30 may be adjustable to a first position, to a second position, and to positions in between the first and second positions. In the first position, the flapper valve 30 directs most or all of the airflow from the evaporator 22 to the cabin 26 through the heater core 24. In the second position, the flapper valve 30 prevents any of the airflow from the evaporator 22 to the cabin 26 from passing through the heater core 24.

In FIG. 1, the flapper valve 30 is represented using a solid line when the flapper valve 30 is in a third position between the first and second positions. In addition, the flapper valve 30 is represented using a dashed line when the flapper valve 30 is in the second position. In FIG. 2, the flapper valve 30 is represented using a solid line and is shown in the first position.

The bypass valve 18 is disposed in the coolant lines 16 and is operable to prevent coolant flow from the engine 12 to the heater core 24. In this regard, the bypass valve 18 is adjustable between an open position (FIG. 1) and a bypass position (FIG. 2). In the open position, the bypass valve 18 allows coolant from the engine 12 to flow through the heater core 24. In the bypass position, the bypass valve 18 prevents engine coolant from flowing through the heater core 24.

A coolant pump (not shown) may circulate coolant through the engine 12 and the heater core 24. In addition, the coolant pump may circulate coolant through one or more other components (not shown) of the vehicle system 10. For example, coolant may be circulated through a radiator, a turbocharger, an engine oil heat exchanger, and/or a transmission fluid heat exchanger. Further, a coolant valve (not shown) may control whether coolant is allow to flow to each of these components, and may control the amount of coolant that is allowed to flow to each of these components.

The coolant lines 16 include a first supply line 16-1, a second supply line 16-2, a first return line 16-3, and a second return line 16-4. The first supply line 16-1 supplies coolant from the engine 12 to the bypass valve 18. The second supply line 16-2 supplies coolant from the bypass valve 18 to the heater core 24. The first return line 16-3 returns coolant from the heater core 24 to the bypass valve 18. The second return line 16-4 returns coolant from the bypass valve 18 to the engine 12. The first and second supply lines 16-1 and 16-2 collectively form a supply flow path. The first and second return lines 16-3 and 16-4 collectively form a return flow path.

When the bypass valve 18 is in the open position (FIG. 1), the bypass valve 18 allows fluid communication between the first and second supply lines 16-1 and 16-2 and between the first and second return lines 16-3 and 16-4. In addition, the bypass valve 18 prevents fluid communication between the supply flow path and the return flow path. The portion of the bypass valve 18 that places the first and second supply lines 16-1 and 16-2 in fluid communication with each other cooperates with the supply lines 16-1, 16-2 to form the supply flow path. Similarly, the portion of the bypass valve 18 that places the first and second return lines 16-3 and 16-4 in fluid communication with each other cooperates with the return lines 16-3, 16-4 to form the return flow path.

When the bypass valve 18 is in the bypass position (FIG. 2), the bypass valve 18 prevents fluid communication between the first and second supply lines 16-1 and 16-2. In addition, the bypass valve 18 places the first supply line 16-1 and the second return line 16-4 in direct fluid communication with each other. In other words, coolant flows from the first supply line 16-1, through the bypass valve 18, and to the second return line 16-4 without passing through the heater core 24. Also, when the bypass valve 18 is in the bypass position, the bypass valve 18 may prevent fluid communication between the first and second return lines 16-3 and 16-4.

The vehicle system 10 further includes an outside air temperature (OAT) sensor 32, an engine coolant temperature (ECT) sensor 34, a cabin air temperature (CAT) sensor 36, a vehicle control module (VCM) 38, and an ignition system 40. The OAT sensor 32 measures the temperature of outside air surrounding the vehicle system 10. The OAT sensor 32 may be disposed in an air intake system (not shown) of the engine 12.

The ECT sensor 34 measures the temperature of coolant circulating through the engine 12 and the heater core 24. In FIGS. 1 and 2, the ECT sensor 34 is shown located in the first return line 16-3. However, the ECT sensor 34 may include one or more temperature sensors disposed in the heater core 24, at an outlet of the heater core 24, and/or in the return flow path (e.g., in the first return line 16-3). The CAT sensor 36 measures the temperature of air within the cabin 26, flowing through the air duct 28 to the interior of the cabin 26, and/or near the outlet of the evaporator 22. In FIGS. 1 and 2, the CAT sensor 36 is shown located within the cabin 26. However, the CAT sensor 36 may include one or more sensors located in the air duct 28, near the outlet of the evaporator 22, and/or within the cabin 26.

The VCM 38 controls the positions of the bypass valve 18 and the flapper valve 30 based on one or more operating conditions of the vehicle system 10 and/or user settings. In one example, the VCM 38 controls the position of the bypass valve 18 based on the outside air temperature from the OAT sensor 32 and/or the engine coolant temperature from the ECT sensor 34. In another example, the VCM 38 controls the position of the flapper valve 30 based on the cabin air temperature from the CAT sensor 36.

The VCM 38 also starts and stops the engine 12 based on an input from the ignition system 40. The ignition system 40 may include a key or a button. The VCM 38 may start (i.e., turn on) the engine 12 when a driver turns the key from an off position to an on (or run) position or when the driver presses the button. The VCM 38 may stop (i.e., turn off) the engine 12 when the driver turns the key from the on position to the off position or when the driver presses the button while the engine 12 is running.

The VCM 38 also automatically starts and stops the engine 12 (i.e., starts and stops the engine 12 independent of the ignition system 40) when one or more operating conditions of the vehicle system 10 satisfy predetermined criteria. In one example, the VCM 38 automatically stops the engine 12 when the vehicle system 10 is stopped (i.e., vehicle speed is zero) and a brake pedal (not shown) of the vehicle system 10 is depressed. In another example, the VCM 38 automatically restarts the engine 12 when the brake pedal is released.

Figure 3:
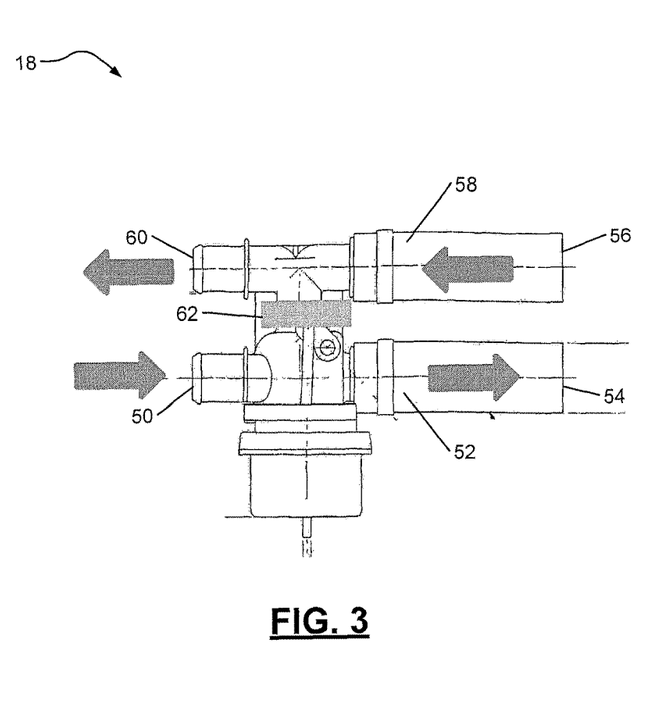
FIG. 3 is a plan view of an example of the bypass valve of FIG. 1 in its open position.
Figure 4:
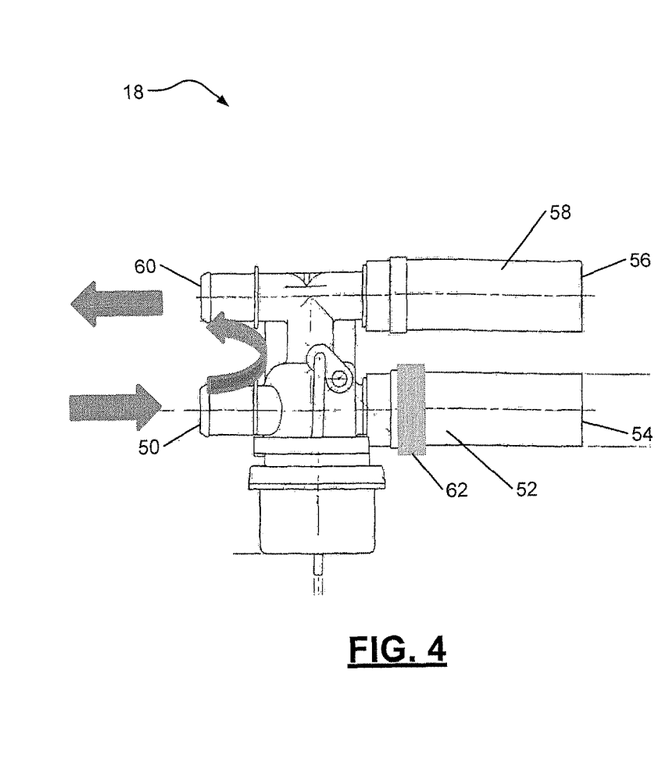
FIG. 4 is a plan view of the bypass valve of FIG. 3 in its bypass position.

Referring now to FIGS. 3 and 4, an example implementation of the bypass valve 18 includes a first inlet port 50, a first flow path 52, a first outlet port 54, a second inlet port 56, a second flow path 58, a second outlet port 60, and a first door 62. The bypass valve 18 may also include an actuator (not shown), such as a servomotor, that is operable to adjust the position of the first door 62. The first inlet port 50 receives coolant from the engine 12 through the first supply line 16-1. When the first door 62 is in a first position (FIG. 3), coolant flows from the first inlet port 50 to the first outlet port 54 through the first flow path 52. The first outlet port 54 discharges coolant to the heater core 24 through the second supply line 16-2.

The second inlet port 56 receives coolant from the heater core 24 through the first return line 16-3. Coolant flows from the second inlet port 56 to the second outlet port 60 through the second flow path 58. The second outlet port 60 discharges coolant to the engine 12 through the second return line 16-4.

The first door 62 is adjustable between the first position (FIG. 3) and a second position (FIG. 4). When the first door 62 is in the first position, the first door 62 prevents fluid communication between the first and second flow paths 52 and 58. When the first door 62 is in the second position, the first door 62 interrupts the first flow path 52 by preventing fluid communication between the first inlet port 50 and the first outlet port 54. In other words, the first door 62 prevents coolant flow from the first inlet port 50 to the first outlet port 54 when the first door 62 is in the second position. Also, when the first door 62 is in the second position, coolant flowing through the bypass valve 18 may conduct some heat to coolant in the heater core 24, but coolant does not flow into the heater core 24 through the first return line 16-3. In various implementations, the bypass valve 18 may include a second door (not shown) that is adjustable into and out of the second flow path 58.

The VCM 38 may adjust the bypass valve 18 to the open position by instructing the actuator to adjust the first door 62 to the first position. In turn, coolant may flow through the first flow path 52, through the heater core 24, and through the second flow path 58. The VCM 38 may adjust the bypass valve 18 to the bypass position by instructing the actuator to adjust the first door 62 to the second position. In turn, coolant may flow directly from the first supply line 16-1 to the second return line 16-4 through the bypass valve 18 without flowing through the heater core 24.

Figure 5:
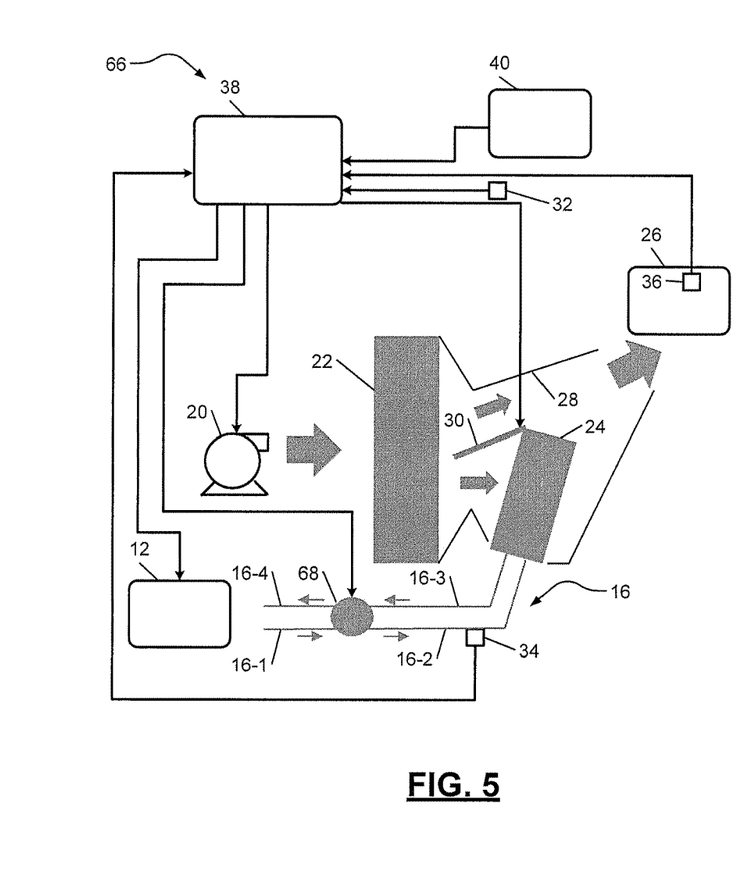
FIG. 5 is a functional block diagram of another example of a vehicle system including another bypass valve according to the principles of the present disclosure, with the bypass valve in an open position.
Figure 6:
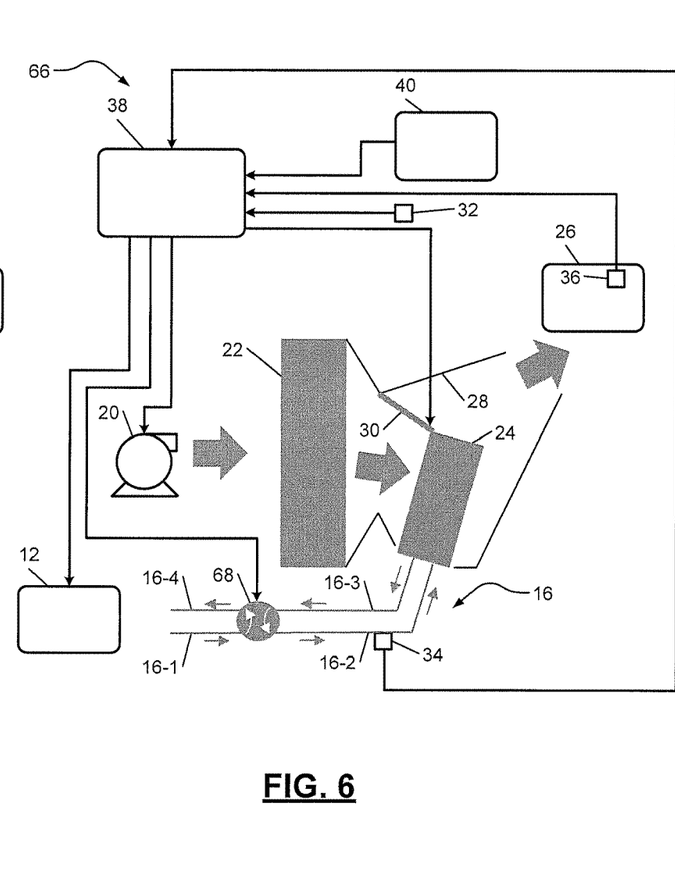
FIG. 6 is a functional block diagram of the vehicle system of FIG. 5 with the bypass valve in a bypass position.

Referring now to FIGS. 5 and 6, a vehicle system 66 is substantially similar or identical to the vehicle system 10 except that the vehicle system 66 includes a bypass valve 68 in place of the bypass valve 18. The bypass valve 68 is disposed in the coolant lines 16 and is operable to prevent coolant flow from the engine 12 to the heater core 24. In this regard, the bypass valve 68 is adjustable between an open position (FIG. 5) and a bypass position (FIG. 6). In the open position, the bypass valve 68 allows coolant from the engine 12 to flow through the heater core 24. In the bypass position, the bypass valve 68 prevents engine coolant from flowing through the heater core 24.

When the bypass valve 68 is in the open position (FIG. 5), the bypass valve 68 allows fluid communication between the first and second supply lines 16-1 and 16-2 and between the first and second return lines 16-3 and 16-4. The portion of the bypass valve 68 that places the first and second supply lines 16-1 and 16-2 in fluid communication with each other cooperates with the supply lines 16-1, 16-2 to form the supply flow path. Similarly, the portion of the bypass valve 68 that places the first and second return lines 16-3 and 16-4 in fluid communication with each other cooperates with the return lines 16-3, 16-4 to form the return flow path.

When the bypass valve 68 is in the bypass position (FIG. 6), the bypass valve 68 prevents fluid communication between the first and second supply lines 16-1 and 16-2. In addition, the bypass valve 68 places the first supply line 16-1 and the second return line 16-4 in direct fluid communication with each other. In other words, coolant flows from the first supply line 16-1, through the bypass valve 68, and to the second return line 16-4 without passing through the heater core 24. Also, when the bypass valve 68 is in the bypass position, the bypass valve 68 prevents fluid communication between the first and second return lines 16-3 and 16-4.

In addition, when the bypass valve 68 is in the bypass position, the bypass valve 68 places the second supply line 16-2 in fluid communication with the first return line 16-3. As a result, coolant circulates through the heater core 24, the second supply line 16-2, the bypass valve 68, and the first return line 16-3 (e.g., in a direction from the second supply line 16-2, to the heater core 24, to the first return line 16-3, and through the bypass valve 68) due to a thermosiphon effect. To this end, when the bypass valve 68 is switched to the bypass position while the engine 12 is automatically stopped, coolant in the heater core 24 is warmer than coolant in the second supply line 16-2 and the first return line 16-3 since coolant in the heater core 24 has absorbed more heat from air flowing from the warming evaporator 22 (the evaporator 22 is warming since the engine 12 is in an auto-stop). This temperature difference causes coolant to circulate through the heater core 24, the second supply line 16-2, the bypass valve 68, and the first return line 16-3.

Since the bypass valve 68 allows coolant to circulate through the bypass valve 68 when the bypass valve 68 is in the bypass position, the coolant in the second supply line 16-2 and the first return line 16-3 increases the cooling capacity of the heater core 24. In turn, the period for which the cabin air temperature is maintained at a desired temperature when the engine 12 is automatically stopped may be increased. The coolant capacity of the heater core 24 may be further increased by increasing the size (e.g., diameter, length) of the second supply line 16-2 and the first return line 16-3 and/or by increasing the size of the heater core 24.

Figure 7:
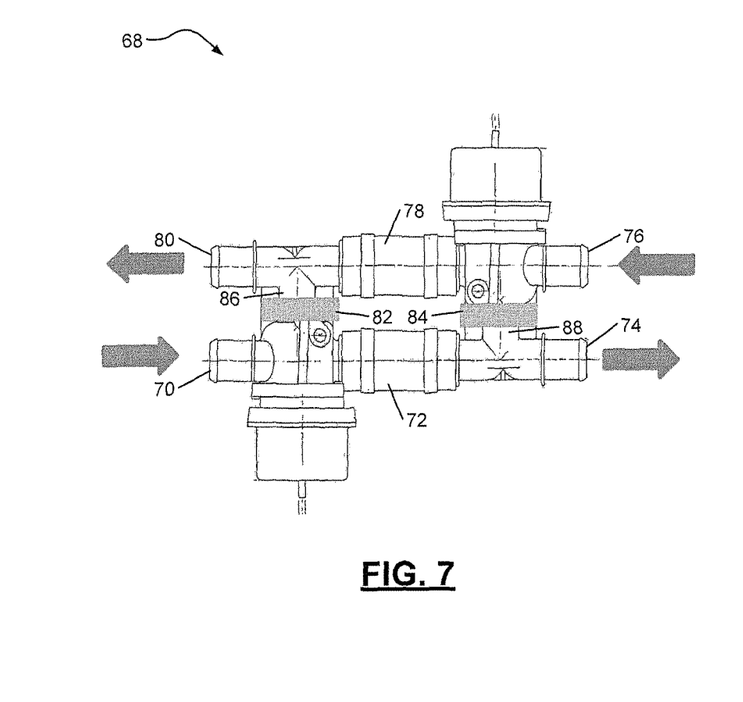
FIG. 7 is a plan view of an example of the bypass valve of FIG. 5 in its open position.
Figure 8:
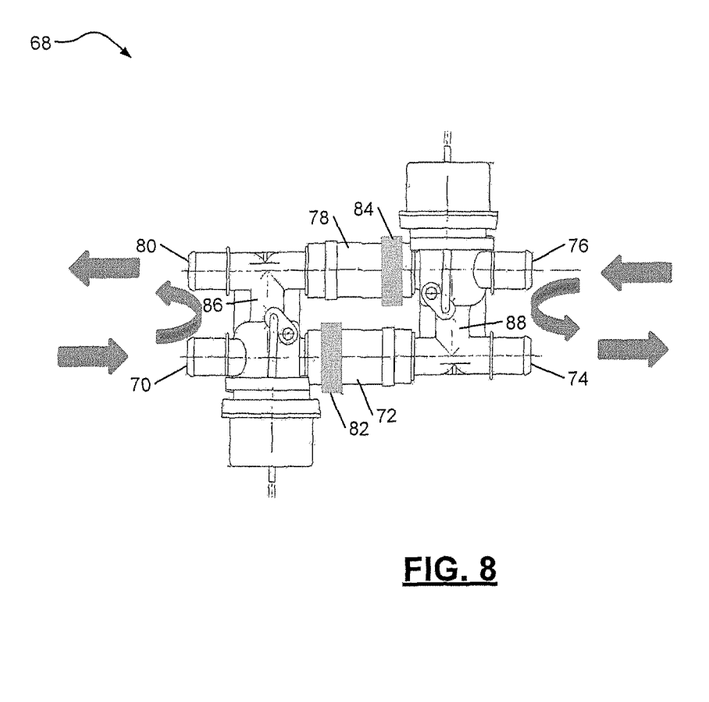
FIG. 8 is a plan view of the bypass valve of FIG. 7 in its bypass position.

Referring now to FIGS. 7 and 8, an example implementation of the bypass valve 68 includes a first inlet port 70, a first flow path 72, a first outlet port 74, a second inlet port 76, a second flow path 78, a second outlet port 80, a first door 82, and a second door 84. The bypass valve 68 may also include one or more actuators (not shown), such as servomotors, that are operable to adjust the positions of the first and second doors 82 and 84. The first inlet port 70 receives coolant from the engine 12 through the first supply line 16-1. When the first door 82 is in a first position (FIG. 7), coolant flows from the first inlet port 70 to the first outlet port 54 through the first flow path 72. The first outlet port 74 discharges coolant to the heater core 24 through the second supply line 16-2.

The second inlet port 76 receives coolant from the heater core 24 through the first return line 16-3. When the second door 84 is in a first position (FIG. 7), coolant flows from the second inlet port 76 to the second outlet port 80 through the second flow path 78. The second outlet port 80 discharges coolant to the engine 12 through the second return line 16-4.

The first door 82 is adjustable between the first position (FIG. 7) and a second position (FIG. 8). When the first door 82 is in the first position, the first door 82 prevents fluid communication between the first and second flow paths 72 and 78. When the first door 82 is in the second position, the first door 82 interrupts the first flow path 72 by preventing fluid communication between the first inlet port 70 and the first outlet port 74. In other words, the first door 82 prevents coolant flow from the first inlet port 70 to the first outlet port 74 when the first door 82 is in the second position.

The second door 84 is also adjustable between its first position (FIG. 7) and a second position (FIG. 8). When the second door 84 is in its first position, the second door 84 prevents fluid communication between the first and second flow paths 72 and 78. When the second door 84 is in its second position, the second door 84 interrupts the second flow path 78 by preventing fluid communication between the second inlet port 76 and the second outlet port 80. In other words, the second door 84 prevents coolant flow from the second inlet port 76 to the second outlet port 80 when the second door 84 is in its second position.

The VCM 38 may adjust the bypass valve 68 to the open position by instructing the actuator to adjust the first and second doors 82 and 84 to their respective first positions. In turn, coolant may flow through the first flow path 72, through the heater core 24, and through the second flow path 78. The VCM 38 may adjust the bypass valve 68 to the bypass position by instructing the actuator to adjust the first and second doors 82 and 84 to their respective second positions. In turn, coolant may flow directly from the first supply line 16-1 to the second return line 16-4 through the bypass valve 68 without flowing through the heater core 24. In addition, due to the thermosiphon effect discussed above with reference to FIGS. 5 and 6, coolant may circulate through the heater core 68 in a reverse direction (i.e., in a direction from the first return line 16-3 to the second supply line 16-2).

The example implementation of the bypass valve 68 shown in FIGS. 7 and 8 further includes a first connection 86 between the first and second flow paths 72 and 78, and a second connection 88 between the first and second flow paths 72 and 78. The first connection 86 is located closer to the first inlet port 70 than the first outlet port 74 and closer to the second outlet port 80 than to the second inlet port 76. The second connection 88 is located closer to the first outlet port 74 than the first inlet port 70 and closer to the second inlet port 76 than to the second outlet port 80.

The first and second doors 82 and 84 prevent coolant flow through the first and second connections 86 and 88, respectively, when the doors 82, 84 are in their respective first positions. The first and second doors 82 and 84 are disposed in the first and second flow paths 72 and 78, respectively, and between the first and second connections 86 and 88, when the doors 82, 84 are in their respective second positions. Thus, the first and second doors 82 and 84 separate coolant circulating through the heater core 24 from coolant circulating through the engine 12.

Figure 9:
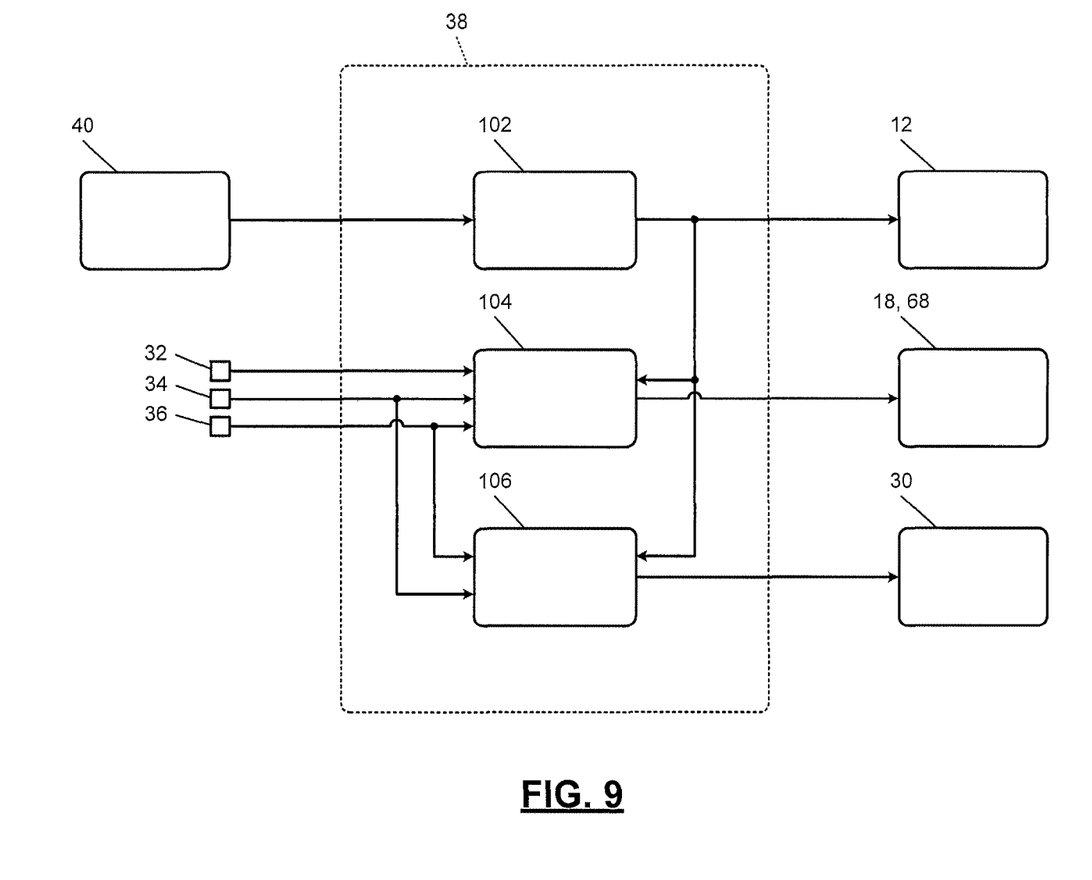
FIG. 9 is a functional block diagram of an example system according to the principles of the present disclosure.

Referring now to FIG. 9, an example implementation of the VCM 38 includes a start-stop module 102, a bypass valve control module 104, and a flapper valve control module 106. The start-stop module 102 starts and stops the engine 12 based on an input from the ignition system 40. The start-stop module 102 may start and stop the engine 12 by sending target actuator values (e.g., spark timing, fueling rate, throttle position) to the engine 12. The start-stop module 102 may start (i.e., turn on) the engine 12 when a driver turns the key from an off position to an on (or run) position or when the driver presses the button. The start-stop module 102 may stop (i.e., turn off) the engine 12 when the driver turns the key from the on position to the off position or when the driver presses the button while the engine 12 is running.

The start-stop module 102 also automatically starts and stops the engine 12 (i.e., starts and stops the engine 12 independent of the ignition system 40) when one or more operating conditions of the vehicle systems 10, 66 satisfy predetermined criteria. In one example, the start-stop module 102 automatically stops the engine 12 when the vehicle systems 10, 66 are stopped (i.e., vehicle speed is zero) and a brake pedal (not shown) of the vehicle system 10 is depressed. In another example, the the start-stop module 102 automatically restarts the engine 12 when the brake pedal is released. The start-stop module 102 may determine whether the brake pedal is depressed or released based on a brake pedal position, which may be measured or estimated based on, for example, brake line pressure.

The bypass valve control module 104 adjusts the bypass valves 18, 68 to their respective bypass positions to prevent coolant flow through the heater core 24 when the engine 12 is automatically stopped. The bypass valve control module 104 receives the operating state of the engine (i.e., whether the engine 12 is on or off) from the start-stop module 102. The bypass valve control module 104 may adjust the bypass valve 18 to its bypass position by instructing bypass valve 18 to adjust the first door 62 to its second position. The bypass valve control module 104 may adjust the bypass valve 68 to its bypass position by instructing the bypass valve 68 to adjust the first and second doors 82 and 84 to their respective second positions.

The bypass valve control module 104 also adjusts the bypass valves 18, 68 to their respective bypass positions during periods when the engine 12 is on (i.e., when the engine 12 is running) in order to charge the heater core 24 (i.e., to decrease the temperature of coolant in the heater core 24). The bypass valve control module 104 determines whether to adjust the bypass valves 18, 68 to their respective bypass positions when the engine 12 is on based on the outside air temperature from the OAT sensor 32, an engine coolant temperature from the ECT sensor 34, and/or a climate control mode of the VCM 38. The bypass valve control module 104 adjust the bypass valves 18, 68 to their respective bypass positions when the engine 12 is on if the outside air temperature, an engine coolant temperature, and/or the climate control mode satisfy predetermined criteria.

In one example, the bypass valve control module 104 adjusts the bypass valves 18, 68 to their respective bypass positions when the engine 12 is on if the outside air temperature is greater than a first temperature (e.g., 20 degrees Celsius). The first temperature may be predetermined and may be less than or equal to a temperature at which most vehicle occupants are comfortable. Alternatively, a vehicle occupant may select the first temperature using a user interface device (not shown) such as a button, a dial, and/or a touchscreen.

In another example, the bypass valve control module 104 adjusts the bypass valves 18, 68 to their respective bypass positions when the engine 12 is on if the engine coolant temperature is greater than a second temperature. The second temperature may be predetermined and may be less than or equal to the first temperature. In one example, the second temperature is less than the first temperature by a predetermined amount (e.g., 10 degrees Celsius).

In another example, the bypass valve control module 104 adjusts the bypass valves 18, 68 to their respective bypass positions when the engine 12 is on if the climate control mode of the VCM 38 is set to a cooling mode. The climate control mode may be set to a heating mode, the cooling mode, or off. A vehicle occupant may select the climate control mode using the user interface device.

Alternatively, the occupant may select a desired cabin air temperature, and the bypass valve control module 104 may determine the climate control mode based on the cabin air temperature measured by the CAT sensor 36 and the desired cabin air temperature. For example, the bypass valve control module 104 may set the climate control mode to the heating mode when the measured cabin air temperature is less than the desired cabin air temperature. In another example, the bypass valve control module 104 may set the climate control mode to the cooling mode when the measured cabin air temperature is greater than the desired cabin air temperature.

The flapper valve control module 106 controls the flapper valve 30 to adjust the amount of airflow through the heater core 24. The flapper valve control module 106 may control the flapper valve 30 by instructing the actuator in the flapper valve 30 to adjust the plate in the flapper valve 30 to its first position, its second position, or positions therebetween. The flapper valve control module 106 adjusts the flapper valve 30 to its first position to direct most or all of the airflow from the evaporator 22 to the cabin 26 through the heater core 24. The flapper valve control module 106 adjusts the flapper valve 30 to its second position to prevent any of the airflow from the evaporator 22 to the cabin 26 from passing through the heater core 24.

When the engine 12 is on and the bypass valves 18, 68 are in their respective open positions, the flapper valve control module 106 may control the flapper valve 30 to direct some or all of the airflow from the evaporator 22 through the heater core 24 in order to heat the air. When the engine 12 is off and the bypass valves 18, 68 are in their respective bypass positions, the flapper valve control module 106 may control the flapper valve 30 to direct most or all of the airflow from the evaporator 22 through the heater core 24 in order to cool the air.

The flapper valve control module 106 may adjust the flapper valve 30 to its first position when the engine 12 is automatically stopped and/or when one or more operating conditions of the vehicle systems 10, 20 satisfy predetermined criteria. In one example, the flapper valve control module 106 adjusts the flapper valve 30 to its first position when the engine 12 is automatically stopped if the measured cabin air temperature is greater than the desired cabin air temperature. In another example, the flapper valve control module 106 adjusts the flapper valve 30 to its first position when the engine 12 is automatically stopped if the climate control mode of the VCM 38 is set to the cooling mode.

Figure 10:
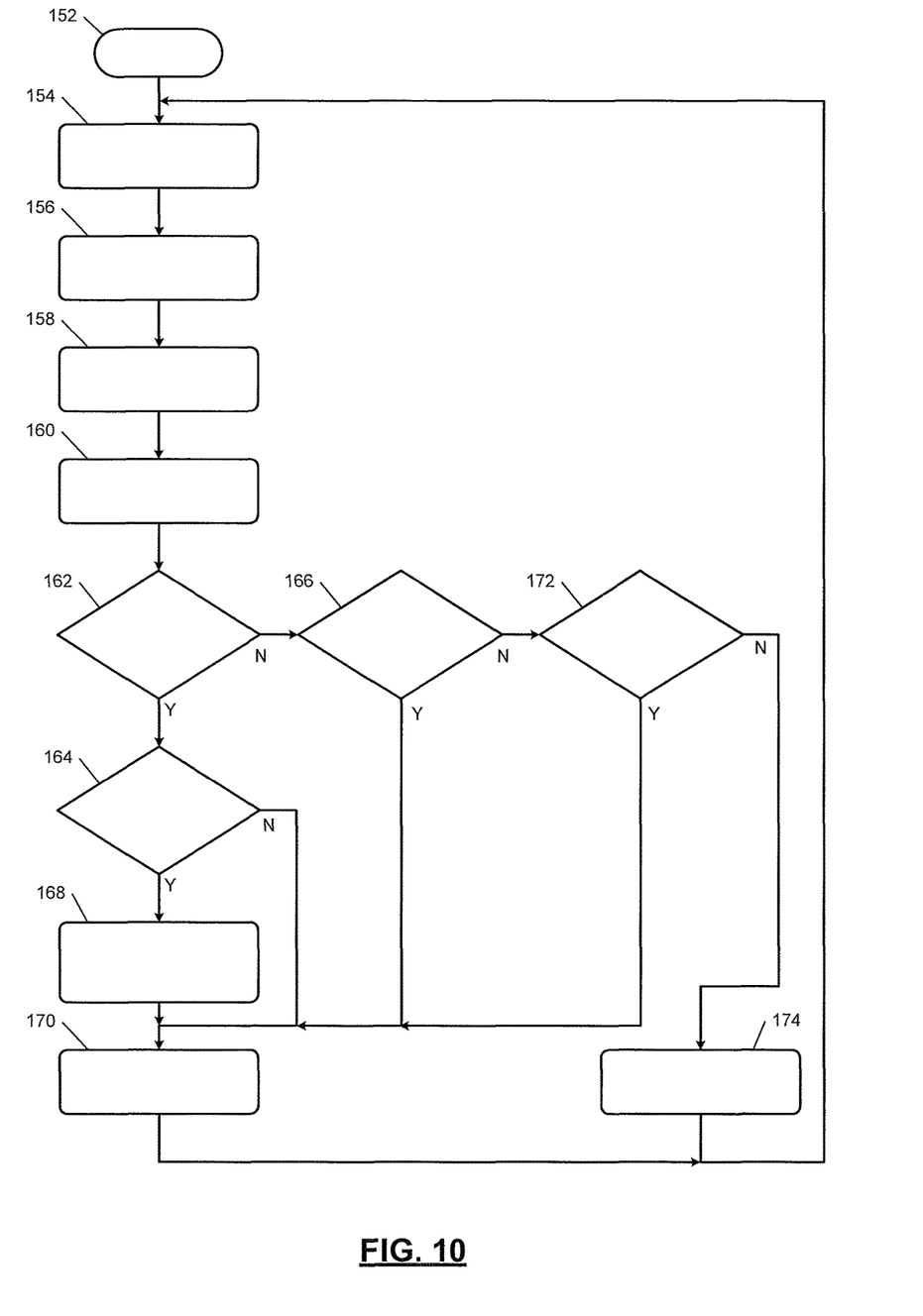
FIG. 10 is a flowchart illustrating an example control method according to the principles of the present disclosure.

Referring now to FIG. 10, an example method for controlling coolant flow through the heater core 24 to increase an auto-stop period of the engine 12 begins at 152. The method is described in the context of the modules of FIG. 9. However, the particular modules that perform the steps of the method may be different than the modules mentioned below, or the method may be implemented apart from the modules of FIG. 9.

At 154, the bypass valve control module 104 monitors the operating state of the engine 12. As discussed above, the bypass valve control module 104 may receive the operating state of the engine 12 from the start-stop module 102. At 156, the OAT sensor 32 measures the outside air temperature. At 158, the ECT sensor 34 measures the engine coolant temperature. At 160, the CAT sensor 36 measures the cabin air temperature.

At 162, the bypass valve control module 104 determines whether the engine 12 is in an autostop (i.e., whether the engine 12 is currently stopped due to an automatic stop). If the engine 12 is in an autostop, the method continues at 164. Otherwise, the method continues at 166. The bypass valve control module 104 may determine whether the engine 12 is in an autostop based on the operating state of the engine 12, instructions sent by the start-stop module 102, and/or the speed of the engine 12. The bypass valve control module 104 may determine that the engine 12 is stopped when the engine speed is less than a predetermined speed. The bypass valve control module 104 may determine that the stop is automatic when the start-stop module 102 sends an automatic stop instruction to the engine 12 within a predetermined period before the engine speed falls below the predetermined speed.

At 164, the bypass valve control module 104 determines whether the measured cabin air temperature is greater than the desired cabin air temperature. If the measured cabin temperature is greater than the desired cabin air temperature, the method continues at 168 before continuing to 170. Otherwise, the method continues directly to 170.

At 168, the flapper valve control module 106 controls the flapper valve 30 to increase airflow through the heater core 24. In one example, the flapper valve control module 106 adjusts the flapper valve 30 to its first position to direct most or all of the airflow from the evaporator 22 through the heater core 24. At 170, the bypass valve control module 104 adjusts the bypass valves 18, 68 to their respective bypass positions, and then returns to 154. The bypass valve control module 104 may adjusts the bypass valves 18, 68 to their respective bypass positions before the flapper valve control module 106 adjusts the flapper valve 30 to its first position.

At 166, the bypass valve control module 104 determines whether the outside air temperature is greater than the first temperature. If the outside air temperature is greater than the first temperature, the method continues at 170. Otherwise, the method continues at 172.

At 172, the bypass valve control module 104 determines whether the engine coolant temperature is greater than the second temperature. If the engine coolant temperature is greater than the second temperature, the method continues at 170. Otherwise, the method continues at 174. At 174, the bypass valve control module 104 adjusts the bypass valves 18, 68 to their respective open positions, and then returns to 154.

In various implementations, the bypass valve control module 104 only adjusts the bypass valves 18, 68 to their respective bypass positions when the outside air temperature is greater than the first temperature. In these implementations, the bypass valve control module 104 does not adjust the bypass valves 18, 68 to their respective bypass positions when the outside air temperature is less than or equal to the first temperature regardless of whether the engine coolant temperature is greater than the second temperature.

In the foregoing discussion, the bypass valve control module 104 is described as adjusting the bypass valves 18, 68 to their respective bypass positions or to the respective open positions. However, in view of the vehicle systems 10, 66, it should be understood that a vehicle system may include only the bypass valve 18 or the bypass valve 68, but not both of the bypass valves 18, 68. Thus, it should also be understood that the bypass valve control module 104 may adjust only one of the bypass valves 18, 68 to its bypass position in each instance where the bypass valve control module 104 is described as adjusting the bypass valves 18, 68 to their respective bypass positions. Similarly, it should also be understood that the bypass valve control module 104 may adjust only one of the bypass valves 18, 68 to its open position in each instance where the bypass valve control module 104 is described as adjusting the bypass valves 18, 68 to their respective open positions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a start-stop module configured to automatically stop an engine of a vehicle;
    a bypass valve control module configured to adjust a bypass valve to a bypass position in response to the engine being automatically stopped, wherein adjusting the bypass valve to the bypass position causes engine coolant to bypass a heater core of the vehicle while allowing engine coolant to circulate through the engine; and
    a flapper valve control module configured to control a flapper valve to adjust an amount of airflow from an evaporator of the vehicle to a cabin of the vehicle through the heater core.

2. The system of claim 1 wherein the bypass valve control module is configured to adjust the bypass valve to the bypass position based on at least one of an operating state of the engine, an outside air temperature, an engine coolant temperature, and a climate control mode.

3. The system of claim 2 wherein the bypass valve control module is configured to adjust the bypass valve to the bypass position when the outside air temperature is greater than a predetermined temperature.

4. The system of claim 2 wherein the bypass valve control module is configured to adjust the bypass valve to the bypass position when the engine coolant temperature is greater than a predetermined temperature.

5. The system of claim 4 wherein the engine coolant temperature is measured in at least one of the heater core and a coolant line extending between the bypass valve and the heater core.

6. The system of claim 2 wherein the bypass valve control module is configured to adjust the bypass valve to the bypass position when the engine is running if at least one of the outside air temperature, the engine coolant temperature, and the climate control mode satisfy a predetermined criteria.

7. The system of claim 1 further comprising the bypass valve, wherein the bypass valve includes:
    a first inlet port that receives coolant from the engine;
    a first outlet port that discharges coolant to the heater core;
    a first flow path extending from the first inlet port to the first outlet port;
    a second inlet port that receives coolant from the heater core;
    a second outlet port that discharges coolant to the engine;
    a second flow path extending from the second inlet port to the second outlet port; and
    a first door that is adjustable between a first position and a second position, the first door preventing fluid communication between the first and second flow paths when the first door is in the first position, the first door interrupting the first flow path by preventing fluid communication between the first inlet port and the first outlet port when the first door is in the second position, wherein the bypass valve control module is configured to adjust the bypass valve to the bypass position by adjusting the first door to the second position.

8. The system of claim 7 wherein the bypass valve includes a second door that is adjustable between a first position and a second position, the second door preventing fluid communication between the first and second flow paths when the second door is in the first position, the second door interrupting the second flow path by preventing fluid communication between the second inlet port and the second outlet port when the first door is in the second position, wherein the bypass valve control module is configured to adjust the bypass valve to the bypass position by adjusting the first and second door to their respective second positions.

9. The system of claim 8 wherein the bypass valve includes:
    a first connection between the first and second flow paths, the first connection being located closer to the first inlet port than the first outlet port and closer to the second outlet port than to the second inlet port; and
    a second connection between the first and second flow paths, the second connection being located closer to the first outlet port than the first inlet port and closer to the second inlet port than to the second outlet port, wherein the first and second doors are disposed between the first and second connections when the first and second doors are in their respective second positions.

10. The system of claim 1 wherein the flapper valve control module is configured to control the flapper valve to direct all of the airflow from the evaporator to the cabin through the heater core when the engine is automatically stopped.

11. A method comprising:
    automatically stopping an engine of a vehicle;
    adjusting a bypass valve to a bypass position in response to the engine being automatically stopped, wherein adjusting the bypass valve to the bypass position causes engine coolant to bypass a heater core of the vehicle while allowing engine coolant to circulate through the engine; and
    controlling a flapper valve to adjust an amount of airflow from an evaporator of the vehicle to a cabin of the vehicle through the heater core.

12. The method of claim 11 further comprising adjusting the bypass valve to the bypass position based on at least one of an operating state of the engine, an outside air temperature, an engine coolant temperature, and a climate control mode.

13. The method of claim 12 further comprising adjusting the bypass valve to the bypass position when the outside air temperature is greater than a predetermined temperature.

14. The method of claim 12 further comprising adjusting the bypass valve to the bypass position when the engine coolant temperature is greater than a predetermined temperature.

15. The method of claim 14 wherein the engine coolant temperature is measured in at least one of the heater core and a coolant line extending between the bypass valve and the heater core.

16. The method of claim 12 further comprising adjusting the bypass valve to the bypass position when the engine is running if at least one of the outside air temperature, the engine coolant temperature, and the climate control mode satisfy a predetermined criteria.

17. The method of claim 11 wherein the bypass valve includes:
- a first inlet port that receives coolant from the engine;
- a first outlet port that discharges coolant to the heater core;
- a first flow path extending from the first inlet port to the first outlet port;
- a second inlet port that receives coolant from the heater core;
- a second outlet port that discharges coolant to the engine;
- a second flow path extending from the second inlet port to the second outlet port; and
- a first door that is adjustable between a first position and a second position, the first door preventing fluid communication between the first and second flow paths when the first door is in the first position, the first door interrupting the first flow path by preventing fluid communication between the first inlet port and the first outlet port when the first door is in the second position, wherein the bypass valve is adjusted to the bypass position by adjusting the first door to the second position.

18. The method of claim 17 wherein the bypass valve includes a second door that is adjustable between a first position and a second position, the second door preventing fluid communication between the first and second flow paths when the second door is in the first position, the second door interrupting the second flow path by preventing fluid communication between the second inlet port and the second outlet port when the first door is in the second position, wherein the bypass valve is adjusted to the bypass position by adjusting the first and second door to their respective second positions.

19. The method of claim 18 wherein the bypass valve includes:
- a first connection between the first and second flow paths, the first connection being located closer to the first inlet port than the first outlet port and closer to the second outlet port than to the second inlet port; and
- a second connection between the first and second flow paths, the second connection being located closer to the first outlet port than the first inlet port and closer to the second inlet port than to the second outlet port, wherein the first and second doors are disposed between the first and second connections when the first and second doors are in their respective second positions.

20. The method of claim 11 further comprising controlling the flapper valve to direct all of the airflow from the evaporator to the cabin through the heater core when the engine is automatically stopped independent.

* * * * *